United States Patent [19]

Dolgas

[11] Patent Number: 5,494,230
[45] Date of Patent: Feb. 27, 1996

[54] METHOD FOR LOADING AND UNLOADING WORKPIECES

[75] Inventor: Patrick A. Dolgas, Milford, Ohio

[73] Assignee: Globe Products Inc., Huber Heights, Ohio

[21] Appl. No.: 349,248

[22] Filed: Dec. 5, 1994

Related U.S. Application Data

[62] Division of Ser. No. 104,890, Aug. 10, 1993, Pat. No. 5,372,319, which is a division of Ser. No. 693,718, Apr. 30, 1991, abandoned, which is a continuation of Ser. No. 416,301, Oct. 3, 1989, abandoned.

[51] Int. Cl.$^6$ .................................................... H02K 15/02
[52] U.S. Cl. ...................... 242/7.05 B; 29/596; 414/751
[58] Field of Search ................... 242/7.05 B, 7.01, 242/7.05 R, 7.05 A, 1.1 R; 414/225, 226, 751, 753; 901/6, 7; 198/346.2, 468.2; 29/596

[56] References Cited

U.S. PATENT DOCUMENTS

| | | |
|---|---|---|
| Re. 31,945 | 7/1985 | Magni . |
| 2,711,817 | 6/1955 | Hautau et al. . |
| 3,587,872 | 6/1971 | Pauly . |
| 3,766,617 | 10/1973 | Forster et al. . |
| 3,878,602 | 4/1975 | Schubert et al. . |
| 3,892,324 | 7/1975 | Faletti, Jr. .............................. 414/749 |
| 4,006,862 | 2/1977 | Shively et al. . |
| 4,087,054 | 5/1978 | Finegold ........................ 414/744.6 X |
| 4,144,960 | 3/1979 | Seourtes . |
| 4,151,636 | 5/1979 | Layer et al. . |
| 4,417,845 | 11/1983 | Burton .............................. 414/718 X |
| 4,483,433 | 11/1984 | Fischer et al. ........................ 198/346.2 |
| 4,556,141 | 12/1985 | Faitel . |
| 4,566,837 | 1/1986 | Shiomi et al. . |
| 4,633,577 | 1/1987 | Banner . |
| 4,648,786 | 3/1987 | Sakurai . |
| 4,655,664 | 4/1987 | Feichtl et al. . |
| 4,695,215 | 9/1987 | Jacoby et al. . |
| 4,718,533 | 1/1988 | Nussbaumer et al. . |
| 4,718,810 | 1/1988 | Hoehn et al. . |
| 4,721,005 | 1/1988 | Yoshiji et al. . |
| 4,732,338 | 3/1988 | Eminger et al. . |
| 4,732,554 | 3/1988 | Hellman . |
| 4,740,025 | 4/1988 | Nelson . |
| 4,768,727 | 9/1988 | Santandrea et al. ............. 198/465.1 X |
| 4,779,474 | 10/1988 | Lovgren ................................... 74/110 |
| 4,817,256 | 4/1989 | Riti et al. . |
| 4,842,476 | 6/1989 | Shiotani . |
| 4,968,214 | 11/1990 | Shiotani ................................ 74/110 X |
| 5,372,319 | 12/1994 | Dolgas ............................ 242/7.05 B |

FOREIGN PATENT DOCUMENTS

| | | |
|---|---|---|
| 1371343 | 7/1964 | France . |
| 3539957 | 6/1987 | Germany . |
| 1456385 | 11/1976 | United Kingdom . |
| 2161776 | 1/1986 | United Kingdom . |

OTHER PUBLICATIONS

Diagrammatic sketches schematically illustrating operation of prior art device.

Photograph of machine publically displayed and placed on sale prior to Oct. 3, 1989.

*Primary Examiner*—Katherine Matecki
*Attorney, Agent, or Firm*—Roger S. Dybvig

[57] ABSTRACT

A method and an apparatus for successively loading workpieces, such as unwound armature assemblies, along a predetermined axis into a workpiece processing machine using an elongate main beam and a staging assembly with workpiece grippers connected to the main beam by a motion multiplier.

8 Claims, 3 Drawing Sheets

FIG-1

METHOD FOR LOADING AND UNLOADING WORKPIECES

This is a divisional of application Ser. No. 08/104,890 filed on Aug. 10, 1993, now U.S. Pat. No. 5,372,319, which was a divisional of application Ser. No. 07/693,718, filed on Apr. 30, 1991, now abandoned, which was a continuation of application Ser. No. 07/416,301, filed on Oct. 3, 1989, now abandoned.

SUMMARY OF THE INVENTION

This invention relates to a method for loading and unloading workpieces for use in a manufacturing process. The invention is primarily directed to a method for loading and unloading armature assemblies for fractional horsepower electric motors into and out of an armature winding machine but may be useful in other manufacturing processes.

There are many manufacturing processes where a workpiece is to be supplied from a remote supply point to a processing machine along a predetermined axis and, after being processed, removed from the processing machine and replaced by the next workpiece to be processed. For example, a double flier armature winding machine has a collet for gripping the shaft of an armature assembly while coils of wire are being wound on the assembly. Unwound armature assemblies must be advanced along a predetermined axis for insertion into the collet. After the winding process is completed, the newly wound armature assembly is removed from the collet and the shaft of another, unwound, armature assembly is inserted into the collet. To meet high speed production requirements, the loading and unloading of the armature assemblies must be carried out quite rapidly.

An object of this invention is to provide an improved method for loading workpieces into and unloading workpieces from a workpiece processing machine. More specifically, it is an object of this invention to provide an improved method for loading armature assemblies for fractional horsepower electric motors (hereinafter called "armature assemblies") into and unloading such armature assemblies from an armature winding machine.

A further object of this invention is to provide an improved method for moving workpieces such as armature assemblies from a load and unload station of a workpiece conveyor system into and out of processing machine. Maufacturing lines using pallet conveyor systems offer certain advantages over automatic production lines having workpiece handling systems that are dedicated to the handling of workpieces of but one configuration. For example, automatic workpiece handling apparatus used to supply armature assemblies to armature winding machines in automatic armature production lines are usually dedicated to the manufacture of armatures having a single set of specifications, such as size, number of coils, and so forth. Automatic armature production lines are essentially inflexible; any change in the armature specifications or one of the processing steps usually necessitates the shutting down of the entire line for substantial retooling of the line.

Conveyor systems using workpiece-suppporting pallets have been developed for manufacturing processes wherein each pallet carries a single workpiece, such as an armature assembly. The pallets are moved along a conveyor line and presented sequentially to a processing machine, such as an armature winding machine. After the processing of a workpiece is completed by the machine, the workpiece is returned to the conveyor system for further processing by other machines adjacent the conveyor system or else for delivery to a loading and Unloading device. A pallet system can be more flexible than the typical, dedicated automatic manufacturing line because different pallets can carry workpieces of different configurations and processing machines can be "stand-alone" machines which are not tied to other machines by automatic workpiece handling apparatus that is restricted for use with workpieces of but one configuration. Stand alone processing machines may be retooled or added to, or removed from, the processing line without interference with the operation of the conveyor system or with the other processing machines to which workpieces are supplied by the pallet conveyors. However, to meet high speed production requirements, there is a need to be able to rapidly load and unload the conveyor-delivered workpieces into and out of the processing machines so that the machines will be operated with maximum efficiency.

When using a stand-alone machine that processes parts delivered by a conveyor system, it is desirable to provide a substantial area of free space around the machine in order to provide convenient access to the machine for maintenance or retooling. However, there is usually a competing need for manufacturing machines to occupy as little floor space as possible to provide room for other manufacturing machines. A further object of this invention is to provide an apparatus for supplying workpieces, such as armature assemblies, rapidly to a workpiece processing machine that requires a reasonably small area while yet providing a substantial area of free space between a workpiece supply conveyor and the processing machine.

In accordance with this invention, apparatus for successively loading workpieces, such as unwound armature assemblies, along a predetermined axis into a workpiece processing machine, includes an elongate main beam, means mounting the main beam for movement in a first path parallel to said axis, main beam drive means for reciprocally moving the main beam along said path generally toward and away from the processing machine, a support carriage mounted on the main beam for movement of the carriage relative to the main beam in a second path parallel to said axis and said first path, carriage drive means for reciprocally moving the support carriage-along said second path toward and away from the processing machine, an armature staging assembly mounted on the support carriage for movement along a third path perpendicular to said axis, and staging assembly drive means for reciprocally moving the staging assembly along said third path. The staging assembly has two workpiece holders or grippers, a first holder or gripper for parts that have been processed and a second for parts that are to be processed.

In operation of the load and unload apparatus of this invention, the main beam and the staging assembly move to a retracted position whereat a part to be processed located on a pallet at a load and unload station is clamped to the first workpiece holder of the staging assembly. The staging assembly is then moved laterally to deliver a processed part from the second workpiece holder to the same pallet. That pallet is carried away by the conveyor assembly while the main beam and the staging assembly are moved to an extended position with the empty, first workpiece holder in position to receive the part then being processed by the processing machine. Meanwhile, a fresh pallet carrying a part to be processed enters the load and unload station so that the foregoing operations may be repeated.

Other objects and advantages will become apparent from the drawings and the following description.

BRIEF DESCRIPTION OF THE DRAWINGS

FIG. 1 is a fragmentary, perspective view of a workpiece loading and unloading apparatus made in accordance with this invention shown used with a pallet conveyor assembly including a pallet supporting an unwound armature assembly. FIG. 1 also fragmentarily shows a portion of a double flier armature winding machine with an armature in position to be wound.

DETAILED DESCRIPTION

Figure 1:
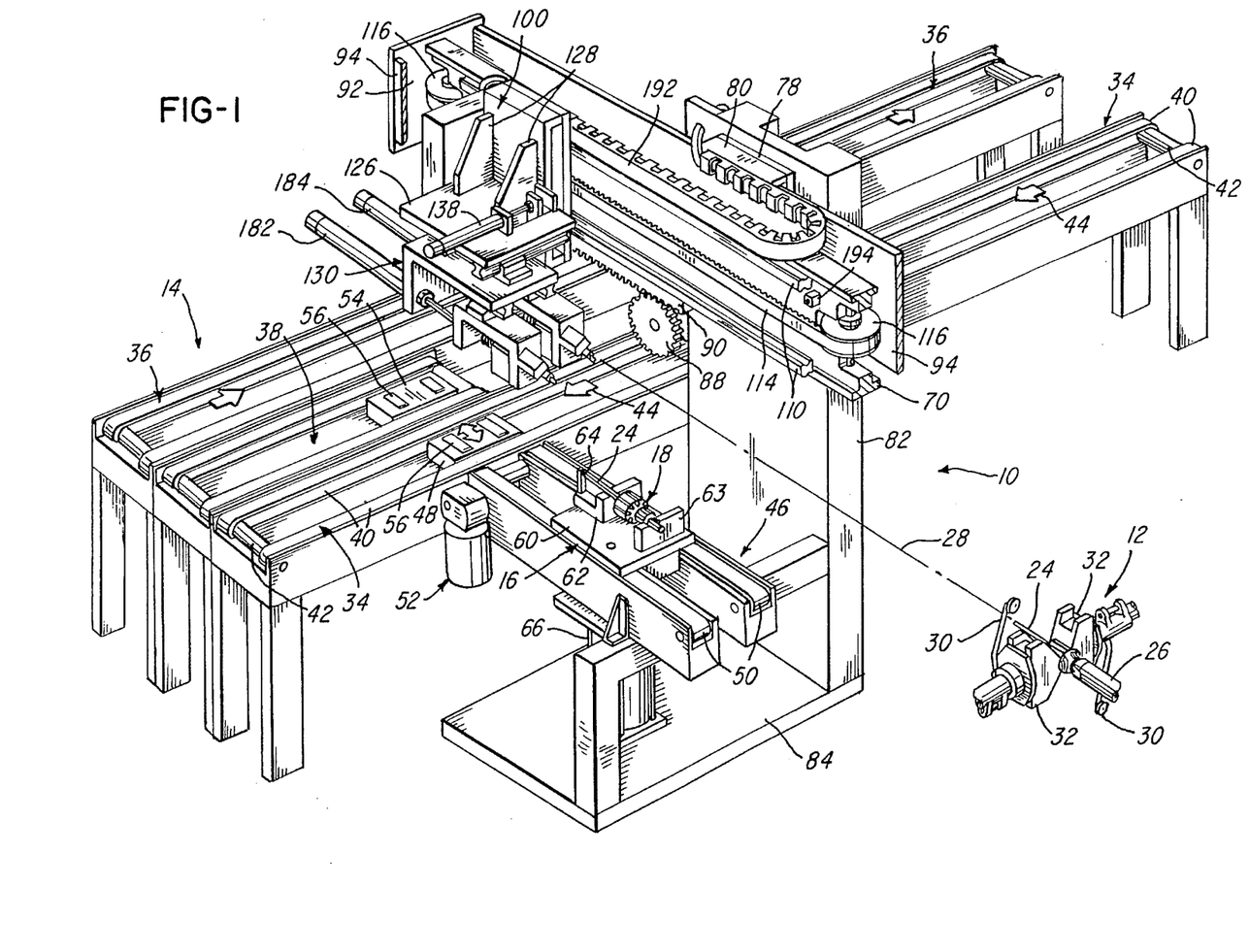

With reference to FIG. 1, a workpiece loading and unloading apparatus in accordance with this invention is generally designated 10. The apparatus 10 is diagrammatically shown associated with a double flier armature winding machine, generally designated 12. The apparatus 10 is also shown associated with a conveyor assembly, generally designated 14, of a commercially available type that functions to deliver pallets, such as that generally designated 16, to a load and unload station which is the location of the pallet 16 shown in FIG. 1, and to remove the pallets 16 from the load and unload station. Although only one pallet 16 is shown in FIG. 1, it will be understood that there will normally be several pallets either queued up or moving along the conveyor assembly 14.

The pallets 16 each carry an unwound armature assembly, generally designated 18, to the load and unload station. The load and unload apparatus 10 delivers the unwound armatures to the winding machine 12. The load and unload apparatus also delivers wound armatures from the winding machine 12 back to the load and unload station. The wound armature assembly is then loaded onto an empty pallet 16 which is then removed from the load and unload station by the conveyor assembly 14.

Figures 2, 5:
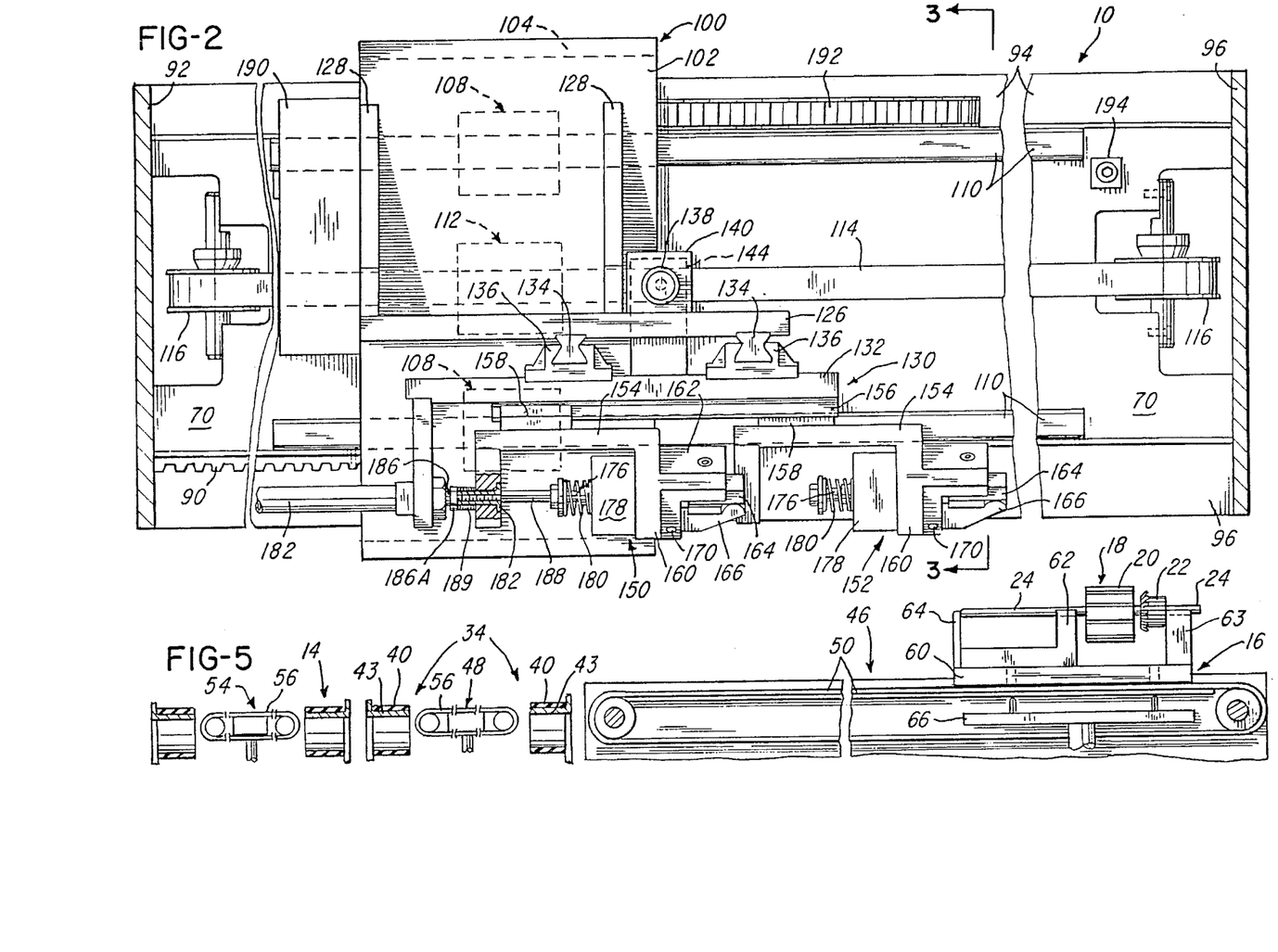
FIG. 2 is a fragmentary, side elevational view with parts shown in cross section and parts broken away of the load and unload apparatus of FIG. 1.
FIG. 5 is a fragmentary, cross-sectional view of a portion of the pallet conveyor assembly shown with an unwound armature assembly supported by a pallet.

With reference to FIGS. 1 and 5, the armature assembly 18 includes a coil-receiving core 20 and a commutator 22 mounted on an armature shaft 24. The representations of the armature assembly 18 in FIGS. 1 and 5 are somewhat simplified, the armature assembly 18 being merely representative of workpieces with which this invention may be used.

With reference again to FIG. 1, the armature winding machine 12 may be entirely conventional and forms no part of this invention. An example of such a machine is shown in U.S. Pat. No. 4,633,577, granted Jan. 6, 1987, to Alvin C. Banner. The parts of the winding machine 12 shown in FIG. 1 include an armature shaft-gripping collet 26 which grips an armature shaft 24 during at least portions of the operation of the winding machine 12. At the beginning of the operation of the winding machine 12, the shaft 24 of an armature 18 is moved toward the collet 26 along the axis, designated 28, of the collet 26 and the collet 26 is then actuated to grip the shaft 24. In operation, wires (not shown) guided by rotating fliers 30 and winding forms 32 are laid into coil receiving slots of the armature core 20 to form coils of wire therein.

With continued reference to FIG. 1 and also to FIG. 5, the illustrated pallet conveyor assembly 14 is representative of conveyor assemblies or other workpiece handling devices with which the load and unload apparatus 10 of this invention may be used. The particular conveyor assembly 14 may be assembled from components supplied by Robert Bosch GmbH of Stuttgart, Germany and is illustrated in a highly simplified form. It includes an incoming conveyor generally designated 34, an outgoing conveyor 36, and an intermediate conveyor 38. The incoming conveyor 34 includes a pair of mutually parallel, spaced, pallet conveying endless belts 40 that are looped around a pair of spaced shafts 42, one of which is rotatably driven by a motor (not shown) so that the upper courses of the belts 40 travel together at the same speed in the direction of the arrows 44 in FIG. 1. As shown in FIG. 5, the top courses of the belts 40 are supported for sliding movement from beneath by plates 43. With this arrangement, a pallet 16 may be loaded onto the upstream end of the conveyor 34 and carried by the belts 40 toward the downstream end of the conveyor 34.

The load and unload station is located along the course of a transversely-extending conveyor generally designated 46 located to one side of the incoming conveyor 34. A transfer elevator device 48 is provided for lifting a pallet 16 from the incoming conveyor 34 and transferring it onto the tranverse conveyor 46. The transverse conveyor 46 includes a pair of drive belts 50 driven by a reversible drive motor and gear assembly 52 for delivering a pallet to the load and unload station and return it from the load and unload station. In FIG. 5, it will be noted that the upper course of the transverse conveyor belts 50 is higher than the incoming conveyor belts 40. By raising the transfer elevator 48 above the incoming conveyor 34, as by an air actuator (not shown) to the level of the upper course of the transverse conveyor belts 50, a pallet 16 can be smoothly transferred to and from the transverse conveyor 46.

The return conveyor 36 is used to carry wound armatures to be unloaded. The intermediate conveyor has no purpose in the conveyor assembly shown. It may, however, be "extended" or else aligned with another conveyor or conveyors to carry armatures assemblies wound by the winding machine 12 to other processing machines for further handling. In more elaborate conveyor systems, it could also be used to carry unwound armatures to other winding machines. A second transfer elevator 54 is located in the intermediate conveyor 38 in line with the transverse conveyor 46 and the transfer elevator 48 for transferring wound armatures to the return conveyor 36. Both transfer elevators 48 and 54 may have reversible drive belts 56 for transferring the pallets 16 as needed.

With reference to FIGS. 1 and 5, each pallet 16 includes a base plate 60 and a mutually spaced pair of upstanding armature supports 62 and 63 having V-shaped notches for supporting the armature assembly 18 by its shaft 24. Each pallet 16 further includes an upstanding locating pin 64 positioned to be engaged by the end of the armature shaft 24 most remote from the commutator. The armature assembly 18 is so located on the pallet 16, either manually or by a suitable mechanism (not shown), that the armature shaft 24 engages the locating pin 64 and the commutator 22 engages the confronting face of the support 63. In consequence, the armature assembly 18 is accurately positioned on the pallet 16 when it arrives at the load and unload station. At this time, an elevator 66 operates to engage the pallet base plate 60 and raise the pallet 16 with the unwound armature 18 thereon above the transverse conveyor 46 to a position wherein it may be gripped by the load and unload apparatus 10 as will be described below.

Figures 3, 4:
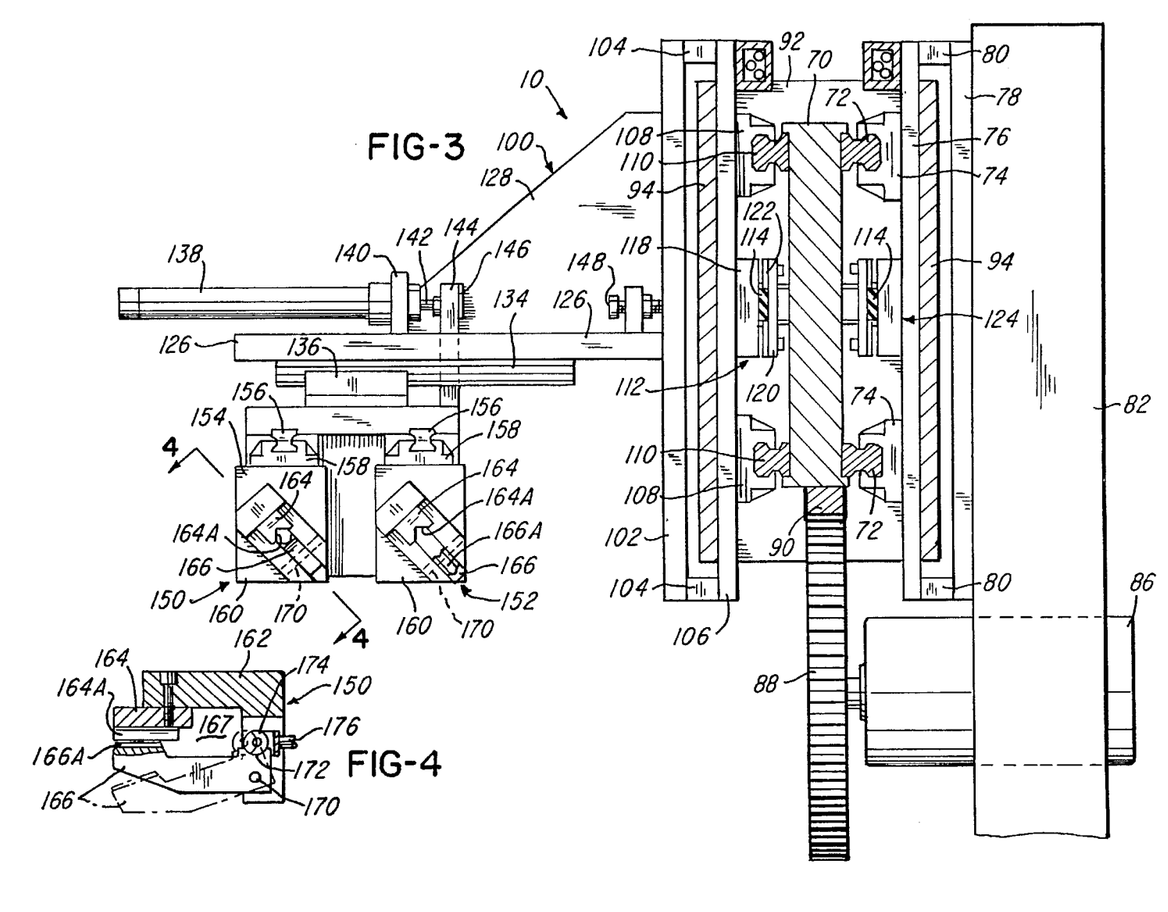
FIG. 3 is a fragmentary, transverse cross-sectional view of the load and unload apparatus taken along line 3—3 of FIG. 2.
FIG. 4 is a fragmentary, cross-sectional view of a shaft clamping device forming part of the load and unload apparatus taken along line 4—4 of FIG. 3.

With reference to FIGS. 1, 2, and 3, the load and unload apparatus 10 of this invention comprises an elongate main beam 70, mounted for movement along a horizontal path lying in a vertical plane parallel to vertical plane of the collet axis 28. For this purpose, a pair of linear bearing rails 72 affixed as by bolts (not shown) to the main beam 70 are slidably mounted in linear bearings 74 affixed to a main beam mounting plate 76 connected to a mounting base plate 78 by spacers 80. The base mounting plate 78 is bolted to a vertical stanchion 82 that is supported by a floor mounting plate 84 (FIG. 1). The main beam 70 is reciprocably driven along its horizontal path of movement by a drive motor 86 affixed to the support stanchion 82 having a drive gear 88 meshing with a rack gear 90 affixed to the bottom of the main beam 70. The main beam 70 is preferably substantially surrounded by a housing including a front plate 92, side plates 94, and a rear plate 96 (shown in cross section in FIG. 2). The front plate 92 and the rear plate 96 are affixed as by bolts to the main beam 70 so that they move therewith. (The relative terms "front" and "rear", and terms of similar import, are used arbitrarily herein as if the "front" of the load and unload apparatus 10 faces the pallet conveyor assembly 14 and its "rear" faces the armature winding machine 12.)

As shown best in FIGS. 2 and 3, the load and unload apparatus 10 further comprises a longitudinally movable staging assembly support carriage, generally designated 100, including a vertical carriage plate 102 connected by spacers 104 to a vertical carriage mounting plate 106 to which linear bearings 108 are connected that slide on linear bearing rails 110 affixed to the side of the main beam 70 most remote from the support stanchion 82 and opposite the side of the main beam 70 to which the first mentioned linear bearings 72 are connected.

The carriage mounting plate 106 is connected by a clamp assembly, generally designated 112, to a timing belt 114 that encircles the main beam 70 and extends around pulleys 116 mounted for rotation about vertical axes at each end of the main beam 70. The clamp assembly 112 includes a clamp base plate 118 facing a clamp top plate 120 having teeth 122 that mesh with the teeth of the timing belt 114. The timing belt 114 is also clamped by a similar clamp assembly 124 affixed to the main beam mounting plate 76. The connection of the timing belt 114 to the staging assembly support carriage 100 and also to the main beam mounting plate 76 produces a motion doubler; the staging assembly support carriage 100 moves along a horizontal path parallel to the path of movement of the main beam 70, but moves twice as far and twice as fast as the main beam 70. Accordingly, a relatively short movement of the relatively massive main beam 70 produces a relatively long movement of the carriage 100.

The staging assembly support carriage 100 further includes a horizontal carriage plate 126 and a pair of gusset plates 128 welded to the vertical carriage plate 102. An armature staging assembly, generally designated 130, is mounted for sliding movement in a horizontal path that is perpendicular to the path of movement of the staging assembly support carriage 100 and to the vertical plane of the pallet axis 28. To this end, the staging assembly 130 comprises a horizontal, transversely movable gripper assembly support carriage plate 132 suspended from the horizontal carriage plate 126 by a bearing assembly including a pair of linear bearing rails 134 affixed to the bottom of the horizontal carriage plate 126 and a pair of linear bearings 136 affixed to the top of the horizontal gripper assembly support carriage plate 132.

Referring to FIG. 3, the staging assembly 130 is reciprocably driven along its tranverse, horizontal path by means of an air actuator 138 mounted on top of the horizontal carriage plate 126 by a threaded support bracket 140 and having a piston rod 142 connected by a vertical drive link 144 to the gripper assembly support carriage plate 132. The air actuator 138 may move the staging assembly 130 to the right as shown in FIG. 3 toward the main beam 70 until a stop plate 146 carried thereby engages an adjustable stop 148 on the horizontal carriage plate 126. The stop 148 is adjusted to accurately locate the right-most position (as viewed in FIG. 3) of the staging assembly 130 for reasons which will become apparent. The left-most position of the staging assembly 130, which is the position shown in FIG. 3, is adjustably fixed by a threaded connection (not shown) between the air actuator 138 and its mounting bracket 140.

Referring to FIGS. 1, 2, and 3, the staging assembly 130 further comprises a pair of side-by-side armature shaft-gripping assemblies, generally designated 150 and 152, respectively. The gripping assembly 150 comprises a gripper carriage 154 mounted for sliding movement in a horizontal path parallel to the path of movement of the main beam 70 and the vertical plane of the collet axis 28 by a linear bearing rail 156 and a linear bearing 158 mounted, respectively, on the underside of the gripper assembly support carriage plate 132 and the top surface of the gripper carriage 154. As best shown in FIGS. 2 and 4, the gripper carriage 154 is generally in the form of an inverted U-shaped body having a depending rear leg 160 with a rearwardly projecting gripper jaw-support piece 162 on which a relatively fixed gripper jaw 164 and a relatively movable or pivotal gripper jaw 166 are mounted. The gripper jaws 164 and 166 have mutually confronting shaft-gripping surfaces 164A and 166A, respectively (FIGS. 3 and 4) constructed to grip the end of an armature shaft 24 therebetween. For this purpose, the movable gripper jaw 166 is mounted for pivotal movement about a pivot pin 170 and has a notch 172 in which a clevis-mounted roller element 174 at the end of the piston rod 176 of an air-operated gripper actuator 178 is received. As apparent, short reciprocal movements of the roller element 174 cause the movable jaw 166 to be pivoted about the pivot pin 170 so that its shaft-gripping surface 166A moves into and out of an armature shaft-gripping relation with respect to the fixed jaw 164. The piston of the gripper actuator 178 is double-ended so that its piston rod 176 extends both forwardly and rearwardly therefrom. The forward end of the piston rod is surrounded by a coil spring that biases the rod 176 such that the movable gripper jaw 166 will be in a shaft-gripping position in the event the air supply to the gripper actuator 178 is interrupted. The gripper assembly 152 has the same construction and mounting as the gripper assembly 150 and like numbers are used to refer to like parts thereof.

Referring to FIG. 3, the shaft-gripping surfaces 164A of the fixed jaw 164 comprise a horizontal top surface and an adjacent vertical surface forming therewith a fixed V-groove that faces downwardly along an axis extending at an angle of 45° with respect to vertical and the gripper jaw pivot pin 170 extends at an angle of 45° with respect to vertical and perpendicular to the axis along which the fixed jaw 164 faces. Furthermore, the area below the fixed gripper jaw 164 is open. Accordingly, when the movable shaft-gripping surfaces 166A pivot away from the fixed jaw 164, an armature shaft 24 may be elevated along a vertical path into engagement with the clamping surfaces 164A of the fixed jaw 164. In addition, it will be noted in FIG. 4 that there is an open pocket 167 forwardly of the fixed gripper jaw 64 that may receive the shaft locating pin 64 on the pallet 16 when, as will be described below, the pallet 16 is raised to deliver an unwound armature assembly to the shaft-gripping assembly 150. Accordingly, it is seen that, by virtue of the construction of the gripper assemblies 150 and 152, they can be used to grip armature shafts that are moved vertically up or down without additional motions of the gripper assemblies or of the shafts that otherwise would be necessary to avoid interference with parts of a pallet or an armature assembly when an armature shaft is either gripped or released.

The gripper assemblies 150 and 152 may be moved relative to the gripper assembly support carriage plate 132 by operation of gripper-extending air actuators 182 and 184, respectively, having piston rods 186 and 188, respectively, that are used to advance the gripping assemblies 150 and 152 toward the winding machine collet 26, respectively, to deliver an unwound armature thereto and to remove a wound armature therefrom, as will be further described below. With reference to FIG. 2, the piston rod 186 is shown threadedly connected to a sleeve 187 slidably received within a bore in the front leg of the gripper carriage 154 and a coil spring 189 is coiled about the piston rod 186 and abuts a nut 186A thereon. This arrangement enables a limited resilient lost motion of the gripper assembly 150 as it advances an armature toward the collet 26 to avoid damage that might otherwise occur to the armature assembly or to the collet 26 if the gripper assembly drive were completely rigid.

The representation of the load and unload apparatus 10 is somewhat simplified. Those familiar with the art will recognize that electrical, such as limit switches or proximity control devices, will be provided as needed to control the movements of the various parts of the apparatus. The electrical connections for the several air actuators and for proximity sensors and the like are located within an electical box 190 mounted on the carriage 100. Electrical and pneumatic lines may be held by a flexible cable tray 192, as well known to those familiar with the art. Suitable safety stops may also be provided. One such stop is shown by block 194 in FIGS. 1 and 2 which is used to prevent accidental overtravel of the carriage 100.

In operation of the load and unload device 10, the left gripper assembly 150 (as shown in FIG. 1) holds only unwound armature assemblies and the right gripper assembly 152 holds only wound armature assemblies. The location of a pallet 16 at the load and unload station on the transverse conveyor 46 is such that an unwound armature assembly 18 is held with the axis of its shaft lying in the same vertical plane as the plane containing the collet axis 28. In operation, the armature staging assembly 130 is located at its rightmost position (as viewed in FIG. 3), closest to the main beam 70, when the main beam 70 is retracted away from the winding machine 12 to a position wherein the staging assembly 130 can grip an unwound armature assembly. When the main beam 70 is thus retracted, the elevator 66 engages and lifts a pallet 16 to a position wherein the shaft of the unwound armature assembly 18 carried thereby engages the shaft-clamping surfaces 164A of the fixed jaw 164. The associated movable gripper jaw 166 is moved into its shaft-gripping position by operation of the actuator 178 of the gripper assembly 150. The elevator 66 is then lowered, leaving the unwound armature assembly in the jaws of the gripper assembly 150 so that the pallet 16 is empty. The staging assembly 130 is then transversely shifted to its left-most position by the air actuator 138 and the elevator 66 is raised again, this time to position the empty pallet 16 with its armature supports 62 and 63 engaging the shaft of the newly wound armature. The gripper assembly 152 is then actuated to release the wound armature onto the elevated pallet 16. As soon as this task is accomplished, the elevator is again lowered to return the pallet to the transverse conveyor 46 whereupon the pallet conveyor system takes over to remove the pallet 16 with the freshly wound armature thereon from the transverse conveyor 46. Shorty thereafter, the pallet conveyor delivers another pallet carrying an unwound armature to the load and unload station.

As the pallet 16 is being lowered, the main beam 70 is extended, by operation of the beam drive motor 86, toward the armature winding machine 12 with the empty gripper assembly 152 aligned with the collet axis 28. The gripper assembly 152 is thereby moved quite close to the winding area of the winding machine 12 and the parts of the load and unload apparatus pause, awaiting the completion of the winding of an armature.

When the winding is completed, the wound armature gripping assembly 152 is advanced by operation of its gripper-extending actuator 184 into a position wherein its fixed gripping jaw engages along the top of the shaft of the newly wound armature assembly. Its movable jaw is then actuated into engagement with the same shaft, the grip of the armature shaft by the winding machine collet 26 released, and the gripping assembly retracted by reverse operation of its gripper-extending actuator 184 so that it removes the newly wound armature from the winding machine 12. The staging assembly 130 is then transversely moved by the air actuator 138 to position the gripper assembly 150 with the unwound armature carried thereby aligned with the collet axis 28, the latter gripper assembly 150 is then extended to insert the unwound armature assembly in the winding machine, its shaft being gripped by the collet 26. The gripper assembly 150 releases its grip on the unwound armature and is retracted from the winding machine. Simultaneously or sequentially, the main beam 70 is retracted from the winding machine whereupon the unwound armature gripping assembly 150 is again positioned over the pallet at the load and unload station in readiness to receive another unwound armature assembly. The foregoing process may then be repeated indefinitely for the continuous production of wound armature assemblies.

Because the staging assembly 130, holding an unwound armature, is closely adjacent the armature winding machine 12 while the winding of another armature is in progress, minimal time is needed to remove the newly wound armature and replace it with the unwound armature.

By employing a relatively massive main beam 70 and the motion multipying arrangement between the main beam 70 and the carriage 100, not only is there substantial available room around the winding machine 12 but also the accuracy of the location of the staging assembly 130 relative to the collet axis is assured. Those familiar with the art will recognize that the relative positions of the load and unload apparatus 10 and the winding machine 12 must be accurately preset upon installation of the machines. This may be done in conventional ways, such as by the use of a tie plate (not shown).

The main beam drive motor 86 is preferably a programmable servo motor so that it can readily be converted for use with armatures having different shaft lengths. A simpler-machine could use a different drive motor. For example, a relatively inexpensive air-operated actuator, although not readily programmable, could be used to drive the main beam.

While the invention has been described with reference to the winding of armature assemblies, it will be apparent that, in its broader aspects, the invention may be used in other manufacturing processes.

Although the presently preferred embodiment of this invention has been described, it will be understood that within the purview of the invention various changes may be made within the scope of the following claims.

I claim:

1. A method of placing unwound shafted motor armatures in a fixed axis collet of an armature winding machine and removing wound armatures therefrom, said method comprising:

providing a staging assembly movable horizontally between a first location adjacent said collet and a second location remote from said collet, said staging assembly including a first armature shaft gripping assembly for removing wound armatures from the machine collet and a second armature shaft gripping assembly for placing unwound armatures in the machine collet, said gripping assemblies being mutually spaced laterally with respect to said collet axis, said first gripping assembly having a first armature shaft gripping device facing toward said collet, and said second gripping assembly having a second armature shaft gripping device facing toward said collet, both said first and second gripping devices being constructed to hold armature shafts with their axes lying in a horizontal plane coinciding with the horizontal plane containing the collet axis, and repeatedly performing the following sequence of operations:

A. locating a first unwound armature in a predetermined, generally horizontal rest position on a first pallet below the level of the collet axis, with the first unwound armature vertically aligned with the staging assembly when the staging assembly is at said second location, B. positioning the staging assembly at said second location with a first wound armature held by said first armature shaft gripping assembly, C. elevating the first pallet to bring the first unwound armature adjacent said second assembly and gripping the first unwound armature shaft at its end remote from the machine by said second armature shaft gripping assembly, D. lowering the empty first pallet, E. moving said staging assembly in a horizontal direction to position said first assembly over said first pallet and elevating said first pallet to a position adjacent said first assembly, F. transferring said first wound armature to said first pallet by releasing it from said first gripping device and again lowering said first pallet to enable removal of said first wound armature to another location for further processing, G. moving the staging assembly toward the winding machine and arresting its movement upon reaching the first location, H. extending said first gripping device from said first assembly to grip the shaft of a newly wound second wound armature in said collet, releasing the grip of said collet and retracting said first gripping device to thereby remove said second wound armature horizontally from the collet, I. moving the staging assembly laterally with respect to the axis of said collet to align the axis of the first unwound armature held in said second gripping device with the axis of said collet, J. extending the second gripping device toward the collet and inserting the shaft of the first unwound armature into the collet, K. gripping the shaft of the first unwound armature by the collet, L. releasing the shaft of the first unwound armature from the second assembly by opening the second gripping device, M. retracting the second gripping device from the collet, N. locating a second unwound armature in said predetermined, rest position on a second pallet with the second unwound armature vertically aligned with the staging assembly when the staging assembly is at said second location, and O. returning the staging assembly to said second location with said second assembly remaining in said vertical plane, whereby the second assembly is positioned over said second unwound armature and thereby ready to receive said second unwound armature, and whereby said second wound armature is held by said first assembly in readiness to be placed on said second pallet.

2. A method according to claim 1 wherein the steps of moving said staging assembly toward the winding machine and returning said staging assembly to said second location are accomplished by mounting said staging assembly on a telescoping motion doubling beam and reciprocally moving said motion doubling beam in a direction parallel to the axis of said collet.

3. A method of placing unwound shafted motor armatures in a fixed axis collet of an armature winding machine and removing wound armatures therefrom, said method comprising:

providing a staging assembly movable horizontally between a first location adjacent said collet and a second location remote from said collet, said staging assembly including a first armature shaft gripping assembly for removing wound armatures from the machine collet and a second armature shaft gripping assembly for placing unwound armatures in the machine collet, said gripping assemblies being mutually spaced laterally with respect to said collet axis, said first gripping assembly having a first armature shaft gripping device facing toward said collet, and said second gripping assembly having a second armature shaft gripping device facing toward said collet, both said first and second gripping devices being constructed to hold armature shafts with their axes lying in a horizontal plane coinciding with the horizontal plane containing the collet axis, and repeatedly performing the following sequence of operations:

with a wound armature gripped by the gripping device of said first assembly, locating an unwound armature in a predetermined, generally horizontal rest position on a conveyor below the level of the collet axis at said second location, with the shaft axis of the unwound armature lying in a vertical plane coinciding with said collet axis, elevating the unwound armature adjacent said second assembly and gripping the unwound armature shaft at its end remote from the machine by said second armature shaft gripping assembly, moving said staging assembly in a horizontal direction perpendicular to the vertical plane to position the wound armature gripped by the gripping device of said first assembly over the rest position previously occupied by said unwound armature, releasing said wound armature from said first gripping device and lowering said wound armature to said conveyor, moving the staging assembly toward the winding machine and arresting its movement upon reaching the first location, extending said first gripping device from said first assembly to grip the shaft of a newly wound armature in said collet, releasing the grip of said collet and retracting said first gripping device to thereby remove the newly wound armature horizontally from the collet, moving the staging assembly laterally with respect to the axis of said collet to align the axis of the unwound armature held in said second gripping device with the axis of said collet, extending the second gripping device toward the collet and inserting the shaft of the unwound armature into the collet, gripping the shaft of the unwound armature by the collet, releasing the shaft from the second assembly by opening the second gripping device, retracting the open second gripping device away from the collet, and returning the staging assembly to said second location with said second assembly remaining in said vertical plane, whereby the second assembly is ready to receive another unwound armature from said conveyor and place the newly wound armature carried by the first assembly onto the conveyor.

4. A method according to claim 3 wherein the steps of moving said staging assembly toward the winding machine and returning said staging assembly to said second location are accomplished by mounting said staging assembly on a telescoping motion doubling beam and reciprocally moving said motion doubling beam in a direction parallel to the axis of said collet.

5. The method of claim 3 wherein the step of locating an unwound armature in a predetermined, generally horizontal rest position on a conveyor below the level of the collet axis at said second location is accomplished by depositing said unwound armature on a pallet and conveying said pallet to said second location on said conveyor and said step of releasing said wound armature from said first gripping device and lowering said wound armature to said conveyor includes the step of depositing said wound armature on the same pallet from which said unwound armature was removed.

6. A method of placing unwound shafted motor armatures in a fixed axis collet of an armature winding machine and removing wound armatures therefrom, said method comprising:

providing a staging assembly movable horizontally between a first location adjacent said collet and a second location remote from said collet, said staging assembly including a first armature shaft gripping assembly for removing wound armatures from the machine collet and a second armature shaft gripping assembly for placing unwound armatures in the machine collet, said gripping assemblies being mutually spaced laterally with respect to said collet axis, said first gripping assembly having a first armature shaft gripping device facing toward said collet, and said second gripping assembly having a second armature shaft gripping device facing toward said collet, both said first and second gripping devices being constructed to hold armature shafts with their axes lying in a horizontal plane coinciding with the horizontal plane containing the collet axis, and repeatedly performing the following sequence of operations:

A. locating a first unwound armature in a predetermined position on a conveyor below the level of the collet axis, with the first unwound armature vertically aligned with the staging assembly when the staging assembly is at said second location, B. positioning the staging assembly at said second location with a first wound armature held by said first armature shaft gripping assembly and with said second shaft gripping assembly vertically aligned with said first unwound armature, C. elevating the first unwound armature to bring the first unwound armature adjacent said second assembly and gripping the first unwound armature shaft at its end remote from the machine by said second armature shaft gripping assembly, D. transferring said first wound armature to said predetermined position to enable removal of said first wound armature to another location for further processing, E. moving the staging assembly toward the winding machine and arresting its movement upon reaching the first location, F. extending said first gripping device from said first assembly to grip the shaft of a newly wound second wound armature in said collet, releasing the grip of said collet and retracting said first gripping device to thereby remove said second wound armature horizontally from the collet, G. extending the second gripping device toward the collet and inserting the shaft of the first unwound armature into the collet, H. gripping the shaft of the first unwound armature by the collet, I. releasing the shaft of the first unwound armature from the second assembly by opening the second gripping device, J. retracting the second gripping device from the collet, K. transferring the staging assembly to said second location with said second assembly positioned over said predetermined position on the conveyor;

L. during said preceding steps C through K locating a second unwound armature in said predetermined position on said conveyor, so that said staging assembly, upon return to said second location, is thereby ready to receive said second unwound armature, and whereby said second wound armature is held by said first assembly in readiness to be transferred to said predetermined position on the conveyor; and M. moving the staging assembly laterally back and forth with respect to the axis of said collet during the preceding steps A through L as needed to enable steps A through L to be performed.

7. A method according to claim 6 wherein the steps of moving said staging assembly toward the winding machine and returning said staging assembly to said second location are accomplished by mounting said staging assembly on a telescoping motion doubling beam and reciprocally moving said motion doubling beam in a direction parallel to the axis of said collet.

8. The method of claim 6 wherein the step of locating an unwound armature in a predetermined, generally horizontal rest position on a conveyor below the level of the collet axis at said second location is accomplished by depositing said unwound armature on a pallet and conveying said pallet to said second location on said conveyor and said step of releasing said wound armature from said first gripping device and lowering said wound armature to said conveyor includes the step of depositing said wound armature on the same pallet from which said unwound armature was removed.

* * * * *